US004001675B2

United States Statutory Invention Registration [19]

[11] Reg. Number: H1675

Barker et al.

[45] Published: Sep. 2, 1997

[54] HYBRID CAPSULE CHARGE

[75] Inventors: James M. Barker, Mansfield; Jerry L. Walker, Fort Worth; Robert S. Riggs, Granbury, all of Tex.

[73] Assignee: Halliburton Company, Dallas, Tex.

[21] Appl. No.: 684,719

[22] Filed: Jul. 22, 1996

[51] Int. Cl.[6] ..... F42C 10/00; E21B 29/00

[52] U.S. Cl. ..... 166/297; 175/4.6; 102/306; 568/931

[56] References Cited

U.S. PATENT DOCUMENTS

| | | | |
|---|---|---|---|
| 3,755,471 | 8/1973 | Dacons | 568/931 |
| 4,739,839 | 4/1988 | Regalbuto et al. | 175/4.6 |
| 4,832,134 | 5/1989 | Gill | 175/4.6 |
| 4,861,924 | 8/1989 | Riggs | 568/931 |
| 4,998,477 | 3/1991 | Barker | 102/275.6 |
| 5,107,929 | 4/1992 | de Cardenas | 166/297 |

*Primary Examiner*—Edward A. Miller

*Attorney, Agent, or Firm*—Paul I. Herman; William M. Imwalle

[57] ABSTRACT

An improved capsule-type charge for use in perforating high temperature production zones in oil or gas wells is disclosed. The improvement consists of using a secondary initiating compound as an initiator, such as 1,3,5-Trinitro-2,4,6-Tripicrylbenzene or 2,2',2",4,4',4",6,6',6",-Nonanitroterphenyl. These initiators work well with commercially available high temperature explosives, such as PYX.

2 Claims, No Drawings

HYBRID CAPSULE CHARGE

BACKGROUND OF THE INVENTION

The present invention relates generally to initiators for use with perforating charges, such as are used in oil and gas wells; and more specifically relates to high temperature initiators for use with high temperature explosives in capsule charges suitable for use in down hole perforating guns.

Capsule type charges are generally capable of superior performance when compared to the equivalent charge shot in a thru-tubing gun. Capsule charges are well known in the art of well bore perforation. Typical capsule charge designs are illustrated in U.S. Pat. Nos. 3,128,702; 2,734,456; and 3,048,102, which are hereby incorporated by reference. In each instance, the capsule charge denotes a fully sealed or encapsulated shaped charge. A plurality of capsule charges are typically suspended on a charge carrier comprised of metal wire or strips. The use of these types of charge carriers is often selected to permit the carrier holding the capsule charges to be passed through a restricted opening in the well bore. The carrier then expands to properly position the charges.

In order to be effective, the charges must be fully encapsulated to prevent exposure of the primary explosive to well bore fluids and pressures. This requires that the capsule charges be detonated by a means external to the sealed capsule. This is typically accomplished by means of a detonating cord positioned adjacent to the rear of the charge capsule. See, for example, U.S. Pat. No. 4,739,839, which is hereby incorporated by reference, having capsule charge 24 and a detent at the rear 56 designed to receive detonating cord 26. However, there are problems encountered when attempting to use capsule charges in high temperature environments (i.e., in excess of +350 F.). Namely, the commercially available high temperature explosives are not sensitive enough to be initiated across the steel barrier which is necessary to maintain the charges integrity under pressure.

Therefore, what is needed is an initiator that works well with capsule charges at high temperatures.

SUMMARY OF THE INVENTION

The above stated objective is met by the inventive use of exotic secondary initiating compounds as boosters. These secondary boosters have been used successfully in capsule charges to initiate commercially available high temperature explosives.

In the preferred embodiment, a high temperature capsule charge will utilize a commercially high temperature explosive, such as PYX. As noted above, at temperatures in excess of 350° F., it may be difficult to initiate PYX across the metal bulkhead utilizing detonating cord. See U.S. Pat. No. 4,739,839, FIG. 5, 54.

Accordingly the present invention utilizes an exotic secondary initiating compound as a booster in the capsule charge explosive area adjacent to the bulkhead. Two booster compounds have demonstrated a satisfactory response to the detonating cord impact and the ability to initiate PYX.

DESCRIPTION OF THE PREFERRED EMBODIMENT

The preferred booster compounds that have been employed thus far and have yielded the best results are:

1. 1,3,5-TRINITRO-2,4,6-TRIPICRYLBENZENE 2. 2,2'2",4,4', 4",6,6', 6",-NONANITROTERPHENYL

These initiators have been successfully used to initiate the commercially available high temperature explosive, PYX.

We claim:

1. Secondary booster compound for use with high temperature explosives in capsule charges, said secondary booster compound being selected from a group consisting of:

1,3,5-Trinitro-2,4,6-Tripicrylbenzene, and, 2,2',2",4,4',4",6,6',6",-Nonanitroterphenyl.

2. A method of perforating a high temperature production zone of a oil or gas well, comprising:

inserting at least one capsule charge into said well proximate said zone, said charge comprising:

a high temperature explosive; and, a booster selected from the group consisting of:

1,3,5-Trinitro-2,4,6-Tripicrylbenzene; and, 2,2',2",4,4',4",6,6',6", -Nonanitroterphenyl; and, detonating said charge.

* * * * *